(12) United States Patent
Moenkemoeller

(10) Patent No.: US 10,866,179 B2
(45) Date of Patent: Dec. 15, 2020

(54) PARTICLE-MEASURING SYSTEM AND METHOD OF DETERMINING PARTICLE-MASS CONCENTRATION IN AN AEROSOL

(71) Applicant: Ralf Moenkemoeller, Bielefeld (DE)

(72) Inventor: Ralf Moenkemoeller, Bielefeld (DE)

(73) Assignee: paragon GmbH & Co. KGAA, Delbrueck (DE)

( * ) Notice: Subject to any disclaimer, the term of this patent is extended or adjusted under 35 U.S.C. 154(b) by 0 days.

(21) Appl. No.: 16/526,172

(22) Filed: Jul. 30, 2019

(65) Prior Publication Data

US 2020/0041398 A1 Feb. 6, 2020

(30) Foreign Application Priority Data

Aug. 3, 2018 (DE) .......................... 10 2018 006 137

(51) Int. Cl.
*G01N 15/02* (2006.01)
*G01N 15/14* (2006.01)
*G01N 15/10* (2006.01)

(52) U.S. Cl.
CPC ..... *G01N 15/0205* (2013.01); *G01N 15/1459* (2013.01); *G01N 2015/1087* (2013.01)

(58) Field of Classification Search
CPC ............... G01N 15/06; G01N 15/0205; G01N 15/1459; G01N 2015/0693; G01N 2015/0046; G01N 2015/1486; G01N 2015/1087; G01N 21/1702; G01N 21/31; G01N 21/255; G01N 2201/068; G01N 2201/06113; H01S 5/042
See application file for complete search history.

(56) References Cited

U.S. PATENT DOCUMENTS

| | | | | | |
|---|---|---|---|---|---|
| 4,771,176 | A | * | 9/1988 | Schiefer | G01N 21/3504 250/339.13 |
| 5,173,749 | A | * | 12/1992 | Tell | G01N 21/031 356/437 |
| 5,453,834 | A | * | 9/1995 | Evenstad | G01P 5/244 356/28.5 |
| 5,644,123 | A | * | 7/1997 | Hait | G06K 9/745 250/214 LS |
| 6,611,335 | B1 | * | 8/2003 | Hovde | G01N 21/39 356/437 |
| 2006/0086891 | A1 | * | 4/2006 | Gottesman | H03F 3/45968 250/214 A |
| 2010/0057378 | A1 | * | 3/2010 | Chen | G01N 21/85 702/25 |
| 2010/0128744 | A1 | * | 5/2010 | Deladurantaye | H01S 3/06754 372/6 |

(Continued)

*Primary Examiner* — Sang H Nguyen
(74) *Attorney, Agent, or Firm* — Andrew Wilford

(57) ABSTRACT

A particle-measuring system for determining particle mass concentrations in aerosols has a laser diode serving as a radiation source and projecting a beam of laser light through a flowing stream of the aerosol. A receiver for receiving the light from the diode after passing through the stream and converting the received light into a measurement. A frequency radiation output of the laser diode is modulated such that the frequency is substantially greater than a cutoff frequency of the receiver so that a specifiable radiation output of the laser diode is achieved on average over a duration of a measurement signal of the receiver.

6 Claims, 1 Drawing Sheet

(56) References Cited

U.S. PATENT DOCUMENTS

2016/0202164 A1* 7/2016 Trainer .............. G01N 15/0211
                                                    356/336
2016/0313233 A1* 10/2016 Zangmeister ...... G01N 21/1702
2017/0315045 A1* 11/2017 Silcott ................ G01N 15/1434
2018/0196012 A1* 7/2018 Blanchard .......... G01N 29/2418

* cited by examiner

PARTICLE-MEASURING SYSTEM AND METHOD OF DETERMINING PARTICLE-MASS CONCENTRATION IN AN AEROSOL

FIELD OF THE INVENTION

The present invention relates to a particle-measuring system. More particularly this invention concerns a method of determining a particle-mass concentration in an aerosol.

BACKGROUND OF THE INVENTION

Such a system typically comprises a laser diode serving as radiation source and a receiver that receives light emitted by the laser diode through an aerosol and converts it into a measurement. A method of determining the particle mass concentrations in aerosols entails emitting and projecting light through an aerosol with a laser diode and receiving the light after passing through the aerosol with a receiver and a parameter of the received light into a measurement.

The laser diodes of such particle-measuring systems are not ideal components. Their emitted radiation output changes with the operating temperature and also over their lifetime. Therefore, most laser diodes used for such purposes are provided with a photo diode that is irradiated by a small portion of the radiation emitted by the laser diodes. Accordingly, the current generated in the photo diode is linearly proportional to the output emitted by the respective laser diode.

The change in the radiation output of the laser diodes can then be compensated for by measuring the photo diode current as equivalent to the radiation emitted by the laser diode and calculating a correction factor from this that is applied to the particle-measurement signals.

Alternatively, it is possible to actively regulate the operating current of the laser diode such that the radiation emitted by the laser diode is at a desired level. The radiation emitted by the laser diode has its set point at exactly one defined photo diode current. The radiation output of the laser diode is regulated with feedback to this set point. If the photo diode current is less than this set point, the operating current of the laser diode is increased. If the photo diode current is greater than this set point, the operating current of the laser diode is reduced.

Operating mode switching represents a problem that has been hitherto unsolvable. This expression denotes a characteristic of a laser diode according to which, in certain operating modes, which are determined by the operating temperature of the laser diode and the operating current thereof, operating mode transitions from one frequency to another frequency take place spontaneously. These spontaneous transitions have an unstable transition range in which chaotic, spontaneous changes occur between two or more operating modes.

The change from one operating mode to another operating mode is accompanied by a change in the output of the laser diode radiation output. Such switching of operating modes produces laser noise, for example in the form of identity noise and noise from other parameters.

The jumps in the emitted radiation output are in the μs range and alter the power of the radiation that is incident on the receiver as scattered light. The greater the scattered light component on the receiver based on the total emitted radiant power, the greater the alternating-voltage signal induced by the switches in the operating modes or by the laser noise.

In simple and compact single-particle counting photometers, which cannot be further reduced due to the scale of the scattered light component, changes in intensity caused by these switchings of the operating modes cannot be distinguished from true signals caused by particles. Accordingly, these dummy signals originating from the change between the operating modes are interpreted as particle signals and then result in a false particle-measurement signal, generally one that is far too high.

Particularly during operation of laser diodes on integrated circuits for automatic power control, a strong ramping-up of power fluctuations has been observed. The integrated automatic power-control circuit attempts to correct the variation in the power output by adjusting the operating current of the laser diode. With control times in the range of a few milliseconds, however, conventional integrated automatic power-control circuits are much too sluggish or too slow. Ultimately, it is precisely the control response of such integrated circuits that has led to the laser diode being operated for a very long time in an operating range with frequently changing operating modes. Accordingly, the particle-measurement signals provided by the particle-measuring system were unusable for long periods of time.

OBJECTS OF THE INVENTION

It is therefore an object of the present invention to provide an improved particle-measuring system.

Another object is the provision of such an improved particle-measuring system and method of determining particle mass concentrations in aerosols that produce reliable and correct particle-measurement signals in a sustained manner.

SUMMARY OF THE INVENTION

A particle-measuring system for determining particle mass concentrations in aerosols has according to the invention a laser diode serving as a radiation source and projecting a beam of laser light through a flowing stream of the aerosol. A receiver for receiving the light from the diode after passing through the stream and converting the received light into a measurement. A frequency radiation output of the laser diode is modulated according to the invention such that the frequency is substantially greater than a cutoff frequency of the receiver so that a specifiable radiation output of the laser diode is achieved on average over a duration of a measurement signal of the receiver.

In other words, the inventive object is achieved according to the invention in that a radiation output of the laser diode can be modulated at a frequency that is substantially greater than a cutoff frequency of the receiver, so that a specifiable radiation output of the laser diode is achieved on average over the duration of a measurement signal of the receiver. The radiation output of the laser diode is modulated at a frequency that is substantially higher than the cutoff frequency of the receiver, so that a specifiable radiation output of the laser diode is achieved over the duration of a measurement signal of the receiver.

The invention moves away from the idea of operating a laser diode stably at a single operating point. To wit, it is proposed according to the invention to modulate the operating mode of the laser diode in such a way that the laser diode passes through a large range of operating states or operating modes in a very short time in a single sensing cycle, it being ensured that a specifiable radiation output of the laser diode is achieved on average over the duration of a measurement signal of the receiver.

The operating current of the laser diode can be advantageously modulated in order to modulate the radiation output thereof.

In order to ensure that the duration of an operating mode no longer occurs as an artifact downstream of the receiver, it is advantageous if a modulation depth of the modulation of the radiation output is selected such that a high number of operating modes can be passed through while a single particle-measurement signal is generated by the receiver.

Expediently, the frequency of the modulation of the radiation output of the laser diode should exceed the cutoff frequency of the receiver by a factor of at least ten.

According to the invention, a particle-measuring system and a method of operating same is provided that can ensure that correct particle-measurement signals are generated over the long term.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
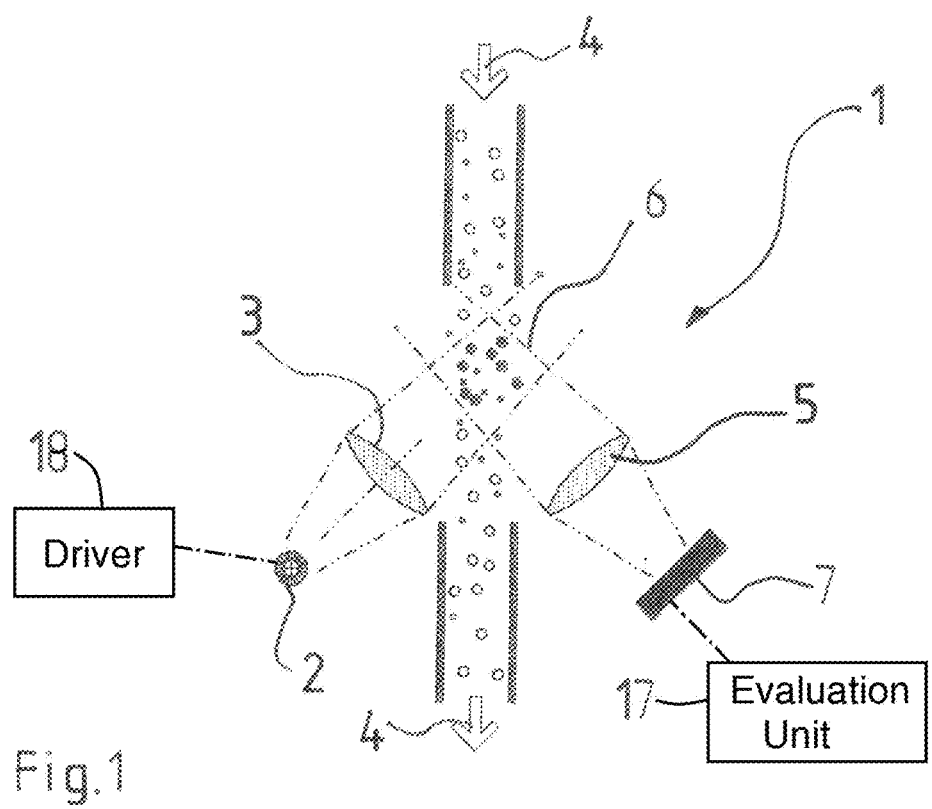
FIG. 1 is a schematic view of a first embodiment of the invention.

As seen in FIG. 1, a first embodiment of an optical particle-measuring system 1 according to the invention is embodied as an aerosol photometer (APM) and serves to determine the particle mass concentration in an aerosol.

The aerosol photometer 1 has a laser diode serving as monochromatic light source 2. The light radiation emitted by the laser diode 2 of the aerosol photometer 1 is concentrated in an optical lens 3. The light beam leaving the optical lens 3 traverses a gas stream 4 that entrains the aerosol to be measured. Light is reflected from the particles of the aerosol contained in the gas stream 4 toward an additional optical lens 5. The two optical lenses 3 and 5 determine the measurement volume 6 shown schematically in FIG. 1. The light radiation directed at a photodetector 7 serving as receiver due to the particles present in the measurement volume or in the measuring chamber 6 and focused by the optical lens 5 is detected by the photodetector 7, and a photometer measurement corresponding to the detected light radiation is forwarded to an evaluation unit 17 of the optical particle-measuring system 1 that is not shown in the drawing.

The photometer measurement forwarded by the photodetector 7 of the aerosol photometer 1 to the evaluation unit 17 corresponds to the particle load present or detected in the measurement volume 6.

In the case of the aerosol photometer 1 of the embodiment described with reference to FIG. 1, a great advantage resides in the fact that the measurement detected in the evaluation unit 17 is independent of the flow rate of the gas stream 4 carrying the aerosol to be measured. In the case of the aerosol photometer 1, the measurement volume is determined by the optical measurement volume.

Figure 2:
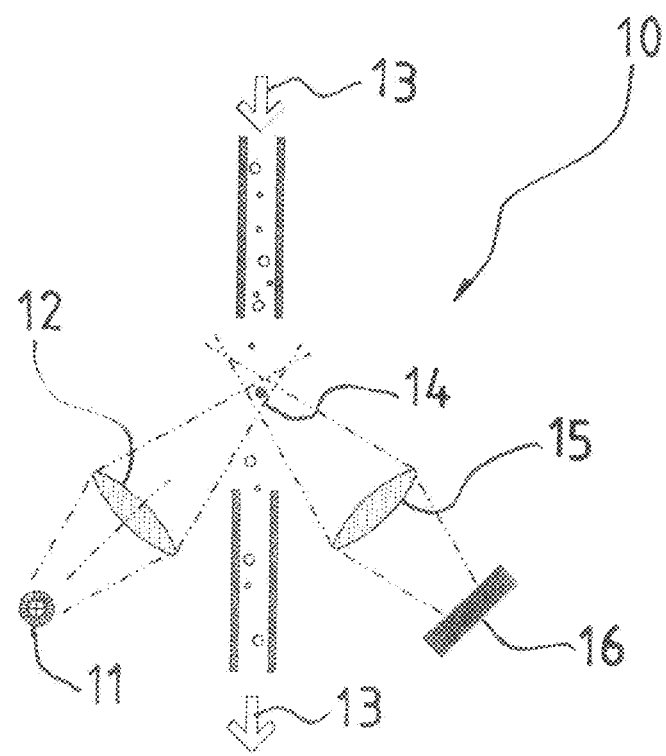
FIG. 2 is a similar schematic view of a second embodiment of the invention.

An embodiment of the optical particle-measuring system shown in FIG. 2 has a single-particle counting photometer 10. The single-particle counting photometer 10 also has a laser diode serving as monochromatic light source 11. The laser diode 11 emits light radiation that is focused by an optical lens 12. The light beam that is focused in the optical lens 12 traverses a gas stream that carries the aerosol to be measured. A measurement volume 14 of the single-particle counting photometer 10 is substantially smaller than the measurement volume of the aerosol photometer 1. In the embodiment of the single-particle counting photometer 10 of FIG. 2, this is achieved in that the light emitted by the laser diode 11 is focused much more intensely by the optical lens 12 than is achieved by the optical lens 3 of the aerosol photometer 12. The measurement volume or measuring chamber 14 of the single-particle counting photometer 10 is dimensioned in consideration of the expected values of aerosols to be measured, so that only a single particle of the aerosol is present therein. The light radiation reflected in the measurement volume 14 of the single-particle counting photometer 10 is directed through an optical lens 15 at photodetector serving as a receiver of the single-particle counting photometer 10 that is located in the radiation path behind the optical lens 15. For each individual particle of the aerosol that travels through the measurement volume or measuring chamber 14 of the single-particle counting photometer 10 with the gas stream 13, a single measurement corresponding to a single particle is thus forwarded at the photodetector 16 of the single-particle counting photometer 10 to an evaluation unit 17 of the single-particle counting photometer 10. Each individual measurement corresponds to the light reflected by a single particle of the aerosol to be measured and directed through the optical lens 15 at the photodetector 16 of the single-particle counting photometer 10.

In contrast to the aerosol photometer 1 described above in connection with FIG. 1, the single-particle counting photometer 10 detects individual particles. Such single-particle counting photometers 10 are used to measure comparatively low particle concentrations, for example in interior spaces. Within the scope of their area of application, i.e. at comparatively low to medium particle concentrations usually between 1000 and 20,000 particles/cm$^3$, high-quality information can be obtained about the particle count and the particle size distribution in the aerosol.

The laser diode 2 or 11 of the two above-described particle-measuring systems 1, 10 is not operated or driven at a single, predetermined operating point in a stable operation. Rather, in the case of the laser diodes 2, 11 of the particle-measuring systems 1, 10, the operating current of the laser diodes 2, 11 is modulated by a driver 18 such that the laser diodes 2, 11 pass through a wide range of different operating conditions in a very short time.

The modulation depth is selected such that a very large number of operating states or operating modes are passed through, for example 100 operating modes. Due to the high modulation frequency, the time spent in a single operating mode is much shorter than the time required for the generation of a single particle-measurement signal of the receiver 7, 16.

For example, the modulation frequency can be set up as follows:

The receivers 7, 16 have a cutoff frequency of about 100 kHz. In order to ensure that no appreciable artifacts of the modulation of the laser-diode operation appear in the particle-measurement signal, it is specified that the frequency of the modulation of the operation of the laser diodes 2, 11 is at least ten times the amplifier cutoff frequency of the photodetectors 7, 16. If ten operating modes are passed through during one modulation period due to the modulation depths of the laser diodes 2, 11, the shortest time interval of the jumps between the operating modes is 100 kHz×10×10×2=20 MHZ. The duration of an operating mode is thus 0.05 μs, and a single operating mode no longer occurs as an artifact behind the photodetectors 7, 16.

I claim:

1. A particle-measuring system for determining particle mass concentrations in aerosols, the system comprising:

a laser diode serving as a radiation source and projecting a beam of laser light through a flowing stream of the aerosol;

a receiver for receiving the light from the diode after passing through the stream and converting the received light into a measurement;

a driver for modulating a frequency radiation output of the laser diode such that the frequency is substantially greater than a cutoff frequency of the receiver so that a specifiable radiation output of the laser diode is achieved on average over a duration of a measurement signal of the receiver; and an evaluation device for selecting a modulation depth of the modulation of the radiation output is selected such that a high number of operating modes passed through and that a single particle-measurement signal is generated by the receiver.

2. The particle-measuring system defined in claim 1, wherein an operating current of the laser diode is modulated by the driver in order to modulate the radiation output thereof.

3. The particle-measuring system defined in claim 1, wherein the frequency of the modulation of the radiation output of the laser diode exceeds the cutoff frequency of the receiver by a factor of at least ten.

4. A method of determining particle mass concentrations in aerosols, the method comprising the steps of:

projecting light through an aerosol from a laser diode;

receiving the projected light after projection through the aerosol in a receiver and converted the received light into a measurement;

modulating a radiation output of the laser diode at a frequency that is substantially higher than a cutoff frequency of the receiver so that a specifiable radiation output of the laser diode is achieved over a duration of a measurement signal of the receiver; and passing the radiation output of the laser diode through a high number of operating modes while the receiver generates a single particle-measurement signal.

5. The method defined in claim 4, wherein the radiation output is modulated by modulating an operating current of the laser diode.

6. The method defined in claim 4, wherein the frequency of the modulation of the radiation output of the laser diode exceeds the cutoff frequency of the receiver by a factor of at least ten.

* * * * *